United States Patent
Gibbs, Sr.

[11] 3,730,228
[45] May 1, 1973

[54] HOSE-CASE ASSEMBLY
[76] Inventor: Paul H. Gibbs, Sr., 201 Wenda Way, El Paso, Tex. 79915
[22] Filed: Jan. 5, 1972
[21] Appl. No.: 215,463

[52] U.S. Cl. ............................138/106, 4/1, 4/114, 248/49, 285/61, 285/302
[51] Int. Cl. ............F16l 7/00, F16l 9/22, F16l 57/00
[58] Field of Search......................138/106, 107, 103, 138/110, 111, 114, 118, 120, 148; 285/45, 61, 226, 302; 248/49, 84, 86, 87; 4/1, 95, 114, 197, 252 R, 268, 276

[56] References Cited

UNITED STATES PATENTS

| | | | |
|---|---|---|---|
| 3,143,146 | 8/1964 | Kennedy | 138/107 |
| 3,682,500 | 8/1972 | Hamrick | 285/302 |
| 1,749,104 | 3/1930 | Kovacs | 4/114 |
| 3,388,705 | 6/1968 | Grosshandler | 285/226 |
| 2,582,249 | 1/1952 | Hendel | 285/226 |
| 3,572,622 | 3/1971 | Smith | 248/49 |
| 2,025,895 | 12/1935 | Praeger | 248/84 |
| 1,566,232 | 12/1925 | Schreiter | 248/87 |
| 2,915,081 | 12/1959 | Warren | 4/114 |

*Primary Examiner*—William I. Price
*Assistant Examiner*—Stuart S. Levy
*Attorney*—David Paul Weaver et al.

[57] ABSTRACT

A hose case for supporting and enveloping a flexible hose that is capable of longitudinal extension and contraction in any position of extension and contraction of the hose. The case is formed of a plurality of telescoping tubular sections, through which the hose extends, that can be relatively extended and contracted in correlation with the extension and contraction of the hose.

6 Claims, 3 Drawing Figures

Patented May 1, 1973

3,730,228

INVENTOR
PAUL H. GIBBS, SR.

BY *Kimmel, Crowell & Weaver*
ATTORNEYS

HOSE-CASE ASSEMBLY

BACKGROUND OF THE INVENTION

In connecting the outlet tank of a trailer to a sewer in a trailer park in order to convey sewage from the tank to the sewer, it is common practice to connect the tank to the sewer by a flexible hose, capable of extension and contraction, so that the sewage may gravitate from the tank to the sewer. It is desirable that the hose be supported in such a manner as to enable the sewage to gravitate from the outlet tank to the sewer without sags in the hose in which sewage may accumulate and freeze, and in such a manner that the hose is protected against damage. It is also desirable that the hose be supported in such a manner that it can be handled in a sanitary manner without the sewage coming in contact with the user and that the support and the hose, as a unit, can be easily stored in a relatively small space when the hose is not in use.

While supports for flexible hose of the type described above have been disclosed, such as the supports shown in U.S. Pat. Nos. 3,169,741; 3,406,933; 3,493,204; and 3,572,622, they have not succeeded in providing a support that fulfills all of the requirements set forth above.

SUMMARY OF THE INVENTION

This invention achieves the desired objectives set forth above by including a hose case formed of telescoping tubular sections through which the hose extends, that enable the hose case to be extended and contracted in correlation with the extension and contraction of the hose. The opposite ends of the hose extend through the opposite free ends of the case so that they may be attached to the tank outlet and the sewer while the remainder of the hose is enveloped by the case.

DESCRIPTION OF THE PREFERRED EMBODIMENT

Figure 1:
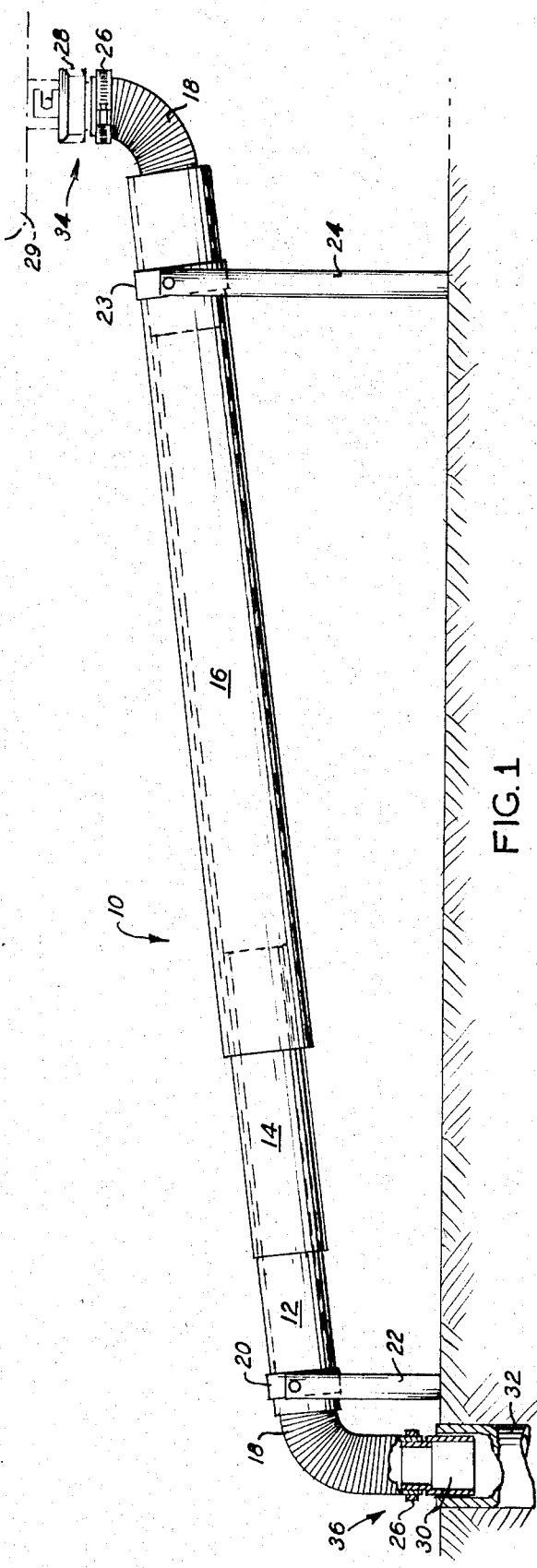
FIG. 1 is a view of an assembly of the hose and the hose case in extended positions with the hose ends attached to the tank outlet and the sewer.

The hose case 10 comprises three telescoping tubular sections 12, 14, and 16 that envelop a flexible sewage hose 18 that extends completely through the hose case 10. The hose 18 is a conventional item that is so constructed that it extends and contracts to conform to the length of the hose case between the maximum length of the hose case and the minimum length of the hose case.

A ring 20 (see FIG. 3) extends about the periphery of the section 12 and is mounted to slide along the section 12. The ring 20 has a pair of relatively short legs 22 pivoted thereto on opposite sides thereof. A ring 23, constructed similarly to the ring 20, extends about the periphery of the section 16 and is mounted to slide along the section 16. A pair of relatively long legs 24 are pivoted to the ring 23 similarly to the manner in which the legs 22 are pivoted to the ring 20. The legs 22 and 24 may be swung between the FIGS. 1 and 3 position wherein they extend downwardly of the case 10 and the FIG. 2 position wherein they extend longitudinally of and alongside the case 10.

The ends of the hose 18 project a short distance beyond the ends of the sections 12 and 16. An O-shaped clamp 26 clamps the end of the hose 18 that projects beyond the free end of the section 16 to a fitting 28 that is adapted to connect the hose to the holding tank outlet of a trailer 29 (FIG. 1). Another O-shaped clamp 26 clamps the end of the hose 18 that projects beyond the free end of the section 12 to a fitting 30 that is adapted to connect the hose to a sewer 32. The fitting 28 and the clamp 26 associated therewith constitute a fitting assembly 34 and the fitting 30 and the clamp 26 associated therewith constitute a fitting assembly 36. The fitting assemblies 34 and 36 cannot respectively move into the tube sections 16 and 12 due to the largest diameters of the fitting assemblies being greater than the diameters of the openings of the free ends of the tubular sections of the case 10 with which they are associated.

Figure 2:
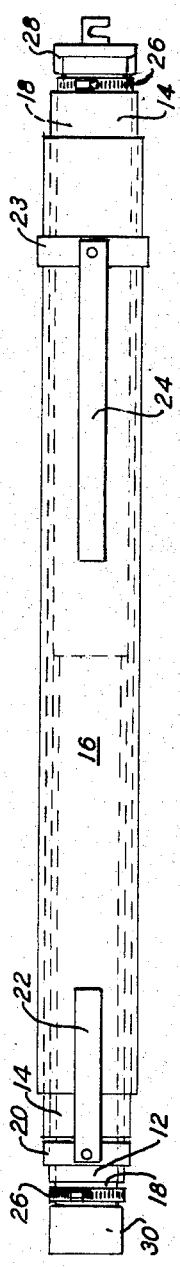
FIG. 2 is a view of the hose-case assembly in the contracted position it assumes when it is being stored.
Figure 3:
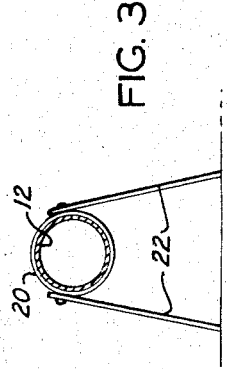
FIG. 3 is a view of a support mounted to the case that is used to support the case above the ground.

When the hose-case assembly is not in use, the case 10 is in the collapsed position shown in FIG. 2 with the sections 12, 14, and 16 in contracted position. In this position, the fitting assemblies 34 and 36 respectively bear against the free ends of the sections 12 and 16, as permitted by the flexible construction of the hose 18. In addition, in this position, the legs 22 and 24 are swung so as to extend axially of the hose-case assembly along the periphery of the case 10. While in this position, the hose-case assembly is usually stored in a storage compartment in the trailer 29.

When the trailer is in a trailer park or camping ground having sewage facilities that include a sewer 32, the hose-case assembly is taken out of the storage compartment, and the fitting assembly 36 is extended away from the tubular section 12 and is inserted into the sewer 32. The hose case is then extended an amount sufficient to bring the fitting assembly 34 close to the holding tank outlet in the trailer 29 and the fitting assembly 34 is extended away from the tubular section 16 and is attached to the holding tank outlet. The legs 22 and 24 are now swung downwardly to the ground-engaging FIG. 1 position so that they may act as support means to support the hose-case assembly in the inclined position of FIG. 1 wherein the hose-case assembly is inclined downwardly from the trailer 29 to the sewer 32 so that sewage may gravitate from the holding tank of the trailer 29 into the sewer 32. Because the fitting assembly 34 has a larger diameter than the diameter of the opening in the free end of the tubular section 16, the extension of the hose case, which includes the movement of the section 16 away from the sections 12 and 14, will automatically extend the hose 18 with the fitting assembly 34 bearing against the free end of the tubular section 16. The inclination of the hose, to fit the contour of the ground, is adjusted by sliding the rings 20 and 23 lengthwise of the hose case 10. In addition, the inclination can be adjusted by varying the extent to which the legs 22, 24 are swung downwardly from the FIG. 2 position.

The above described installation of the hose-case assembly has the following advantages:

a. The adjustability of the legs 22, 24 on the hose case 10 allows for proper drainage flow through the hose 18 regardless of the length of the hose-case assembly within the maximum and minimum lengths of the hose-case assembly.

b. Since the case 10 envelops the hose 18 for its entire length, except for the ends of the hose, in all lengths to which the hose-case assembly is adjusted, the hose is protected by the case from damage that may occur from stray objects, such as stones or other flying objects, or from people tripping over the hose.

c. Since the portion of the hose 18 within the case 10 is confined by the case to incline linearly, there are no sags in the hose which can collect liquid sewage and freeze and thus damage the hose and create undesired pockets of sewage.

When the need for using the hose-case assembly ends and it is desired to dismantle this assembly, the fitting assembly 34 is detached from the holding tank outlet of the trailer 29; the detached end of the hose-case assembly is elevated; the hose-case assembly is flushed with water from a hose entering its detached end so that the water may clean out any residual sewage in the hose 18 and flush it into the sewer 32; the fitting assembly 36 is detached from the sewer 32; the hose-case assembly and the legs 22, 24 are contracted into the FIG. 2 position; and the hose-case assembly is stored in the storage compartment of the trailer 29. This arrangement enables the hose-case assembly to be dismantled and stored in a sanitary manner without the hands of the user coming into contact with any sewage that is in the hose 18 and enables the hose-case assembly to be contracted for easy storage in the trailer 29.

I claim:

1. In combination with a flexible hose so constructed as to be capable of longitudinal extension and contraction, said hose having a first end portion that is adapted to be attached to a holding tank outlet and a second end portion that is adapted to be attached to a sewer in such a manner as to incline downwardly from the tank outlet to the sewer, a hose case comprising: a plurality of telescoping tubular sections having openings extending therethrough through which the hose extends so that the sections envelop the hose, said sections being so constructed as to be capable of relative longitudinal extension and contraction in correlation with the extension and contracting of the hose, said sections including a first section having a first free end located proximate to said first hose end portion and a second section having a second free end located proximate to said second hose end portion, whereby the hose case supports the portion of the hose that is between said section ends, leaving unsupported only said end portions of the hose, regardless of the length to which the hose has been extended or contracted.

2. The hose-case combination of claim 1 further comprising: a first, relatively long, support means mounted to and extending downwardly of said first section; and a second, relatively short, support means mounted to and extending downwardly of said second section, said first and second support means being adapted to engage the ground and support the case so that it inclines downward from said tank outlet to said sewer.

3. The hose-case combination of claim 2 wherein each of said support means comprises: leg means mounted to its associated section for movement between a position wherein it extends alongside its associated section and a position wherein it extends downwardly of its associated section.

4. The hose-case combination of claim 3 further comprising: means mounting each of said leg means for adjustment longitudinally of its associated section.

5. The hose-case combination of claim 2 wherein said first support means comprises: a first ring mounted to said first section for adjustment longitudinally of said first section; and a pair of relatively long legs pivoted to said first ring on opposite sides of said first section for movement between a position wherein they extend alongside said first section and a position wherein they extend downwardly of said first section; and wherein said second support means comprises: a second ring mounted to said second section for adjustment longitudinally of said second section; and a pair of relatively short legs pivoted to said second ring on opposite sides of said second section for movement between a position wherein they extend alongside said second section and a position wherein they extend downwardly of said second section.

6. The hose-case combination of claim 1 further comprising: a first fitting assembly, mounted to said first hose end portion outwardly of said first free end, adapted to be attached to said holding tank outlet, the largest diameter of said first fitting assembly being greater than the diameter of the opening at said first free end; and a second fitting assembly, mounted to said second hose end portion outwardly of said second free end, adapted to be attached to said sewer, the largest diameter of said second fitting assembly being greater than the diameter of the opening at said second free end; whereby an extension of said case causes a corresponding extension of said hose.

* * * * *